US009833025B2

(12) United States Patent
Knapp

(10) Patent No.: US 9,833,025 B2
(45) Date of Patent: Dec. 5, 2017

(54) ADJUSTABLE HEAD AND NECK SUPPORT SYSTEM

(71) Applicant: Travis Lyn Knapp, Austin, TX (US)

(72) Inventor: Travis Lyn Knapp, Austin, TX (US)

(*) Notice: Subject to any disclaimer, the term of this patent is extended or adjusted under 35 U.S.C. 154(b) by 197 days.

(21) Appl. No.: 14/733,881

(22) Filed: Jun. 8, 2015

(65) Prior Publication Data
US 2015/0352988 A1 Dec. 10, 2015

Related U.S. Application Data

(60) Provisional application No. 62/008,854, filed on Jun. 6, 2014.

(51) Int. Cl.
B60N 2/48 (2006.01)
A41D 1/00 (2006.01)
A47C 7/38 (2006.01)
B60N 2/24 (2006.01)
B60N 2/66 (2006.01)

(52) U.S. Cl.
CPC .......... A41D 1/00 (2013.01); A47C 7/383 (2013.01); B60N 2/245 (2013.01); B60N 2/4808 (2013.01); B60N 2/4879 (2013.01); B60N 2/663 (2015.04); B60N 2002/4888 (2013.01)

(58) Field of Classification Search
CPC .......... B60N 2/4879; B60N 2002/4888; A47C 7/383; A47C 7/36; A47C 7/425; A47C 16/00
USPC ................................................. 297/220, 221
See application file for complete search history.

(56) References Cited

U.S. PATENT DOCUMENTS

| 3,062,586 | A | * | 11/1962 | Rowland | B60N 2/4879 297/230.11 |
| 3,101,973 | A | * | 8/1963 | Toth | A47C 7/383 297/391 |
| 4,679,263 | A | * | 7/1987 | Honer | A47C 7/383 297/393 |
| 5,121,969 | A | * | 6/1992 | Schroeder | A47C 1/143 297/397 |
| 5,251,957 | A | * | 10/1993 | Lemens | A47C 7/425 297/230.1 |
| 5,707,108 | A | * | 1/1998 | Pi | A47C 7/46 297/184.1 |
| 6,641,220 | B2 | * | 11/2003 | Clegg | A47C 7/383 297/397 |
| 7,004,545 | B2 | * | 2/2006 | Miller | A47C 7/383 297/393 |
| 7,059,678 | B1 | * | 6/2006 | Taylor | A47C 7/405 297/284.4 |

(Continued)

Primary Examiner — David R Dunn
Assistant Examiner — Tania Abraham
(74) Attorney, Agent, or Firm — Andrew W. Chu; Craft Chu PLLC

(57) ABSTRACT

The head and neck support system includes a pair of rods, a frame having an upper portion and a lower portion, and a pad having an attachment device, a first surface and a second surface. The pad wraps around the frame so as to form a loop to hold the head of a user against the second surface. The pad can have an eye mask or face mask section for a resting or sleeping position for the user. The lower portion of the frame is aligned with the back of the user so that the weight of the user stabilizes the frame. The rods connect the lower portion and the upper portion of the frame so that stabilization from the back of the user supports the pad and head of the user.

17 Claims, 4 Drawing Sheets

(56) References Cited

U.S. PATENT DOCUMENTS

| | | | |
|---|---|---|---|
| 7,909,399 B2* | 3/2011 | Rutty | A47C 7/425 297/230.11 |
| 8,239,987 B2* | 8/2012 | Sharp | A47C 7/383 5/636 |
| 8,459,737 B2* | 6/2013 | Brotsch | A47C 7/425 297/230.1 |
| D695,996 S | 12/2013 | Paul | |
| 2011/0095582 A1* | 4/2011 | Romas | A47C 7/383 297/220 |
| 2013/0047342 A1 | 2/2013 | Schwingendorf et al. | |
| 2013/0125312 A1 | 5/2013 | Harooni | |

* cited by examiner

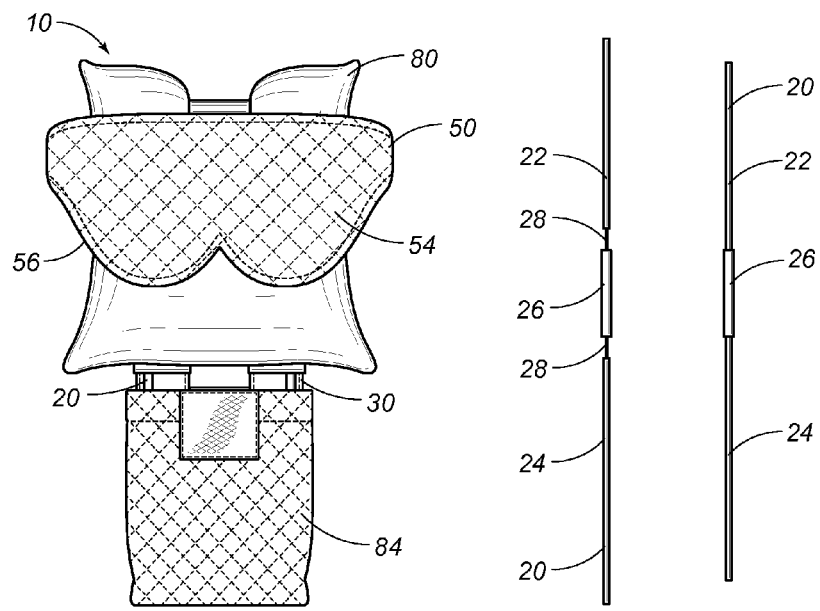
FIG. 1
FIG. 2
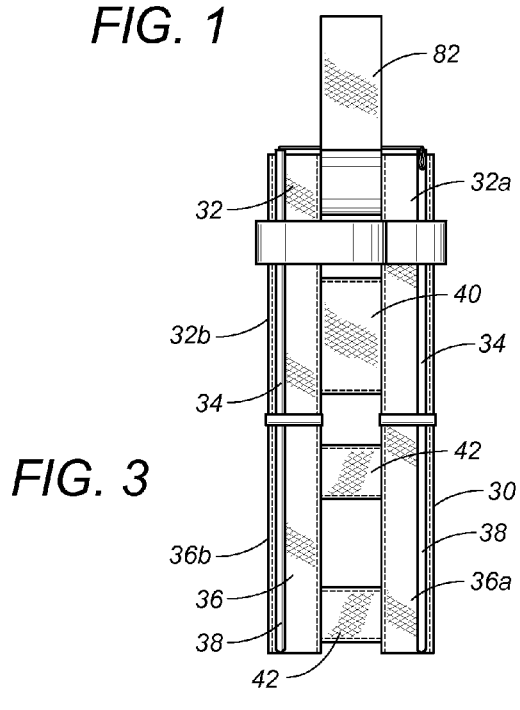
FIG. 3
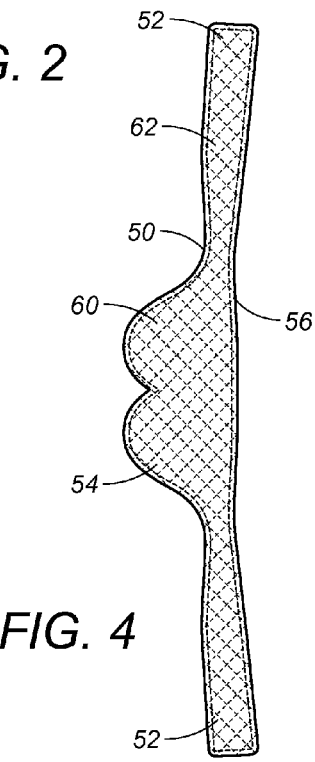
FIG. 4

ADJUSTABLE HEAD AND NECK SUPPORT SYSTEM

RELATED U.S. APPLICATIONS

The present application claims priority under 35 U.S.C. Section 119(e) from U.S. Provisional Patent Application Ser. No. 62/008,854, filed on Jun. 6, 2014, entitled "ADJUSTABLE HEADREST SYSTEM".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to a head and neck support system. More particularly, the present invention relates to an adjustable head and neck support system for an individual in the seated position. Even more particularly, the present invention relates to a head and neck support system with adjustable dimensions and comfort accessories.

2. Description of Related Art Including Information Disclosed Under 37 CFR 1.97 and 37 CFR 1.98

Orthopedic pillows correct body positioning for sleepers. The pillow sets the placement and orientation of particular body parts in safe and healthy resting positions. There are particular challenges for body positioning, when a sleeper is in the sitting position, such as when a passenger is seated on an airplane flight. There is limited room, and mobility is restricted. A body position for sleeping is not always possible. Difficult seated positions for sleeping can also be found in other situations, such as riding in trains and long distance rides in cars.

Various devices have been developed to facilitate sleeping in the seated position. A neck pillow is a common option for travelers. The U-shaped inflatable pillow is placed on the back of the neck of the user so that the head is prevented from falling side to side and back and forward. The neck pillow fits on the user so that the height is always correct and set by the neck of the user. The neck pillow is portable and easily stored.

Several patents and publications are available for review in the field of sleeping devices, when the body is in the seated position. U.S. Patent Publication No. 20130047342, published for Schwingendorf et al, on Feb. 28, 2013, discloses a neck pillow with a bone structure support. U.S. Patent Publication No. 20130125312, published for Harooni, on May 23, 2013, describes a new pillow with a hood. The hood suspends the pillow around the neck to accommodate a sleeper. U.S. Design Pat. No. D695996, issued on Dec. 24, 2013 to Paul, shows a travel pillow with a scarf attachment to maintain position of the neck pillow on the user.

The prior art devices fail to stabilize the head of the sleeper on the seat. The devices do not consistently hold the position of the head to the seat back or top of the seat. Additionally, the devices are not adjustable for sleepers of different sizes and heights.

It is an object of the present invention to provide an embodiment of a head and neck support system to facilitate sleeping in a seated position.

It is an object of the present invention to provide an embodiment of a head and neck support system that is adjustable.

It is another object of the present invention to provide an embodiment of a head and neck support system having an adjustable frame.

It is another object of the present invention to provide an embodiment of a head and neck support system having a pad with an adjustable position relative to the frame.

It is still another object of the present invention to provide an embodiment of a head and neck support system having a pad with an adjustable engagement to the frame.

It is an object of the present invention to provide an embodiment of an adjustable head and neck support system with a removable and washable pad.

It is an object of the present invention to provide an embodiment of an adjustable head and neck support system with a pad to form a mask.

It is an object of the present invention to provide an embodiment of an adjustable head and neck support system to support the head of a user in the seated position.

These and other objectives and advantages of the present invention will become apparent from a reading of the attached specifications and appended claims.

SUMMARY OF THE INVENTION

Embodiments of the adjustable head and neck support system comprise a pair of rods, a frame having an upper portion and a lower portion, and a pad having an attachment means, a first surface and a second surface. The rods are adjustable in length from a shortened configuration to an extended configuration so as to account for any size or height of the user. The frame has upper and lower sleeves in the upper and lower portions, respectively. The upper portion and the lower portion are planar in an assembled position with the rods inserted through the sleeves in alignment. The upper portion and the lower portion are folded in a disassembled position with the rods in the shortened configuration. The pad wraps around the frame so as to form a loop to hold the head of a user against the second surface. The pad can be comprised of an eye cover, face mask or a strap for hats. The pad engages the head of the user for a resting or sleeping, while in the seated position. The lower portion of the frame aligns with the back of the user so that the weight of the user stabilizes the frame, and consequently the head of the user.

In other embodiments, the adjustable head and neck support system of the present invention includes a cushion element. The upper portion of the frame has a top strap to mount the cushion element, which aligns with the head of the user. In some embodiments, the cushion element is comprised of memory foam. In still other embodiments, the system includes a slip element to cover the lower portion of the frame. The slip element provides comfort and protection to the back of the user and the back of the seat.

The rods, frame and pad adjust relative to each other with various extensions and collapsed configurations. The system can also be fully collapsed for easy transport and storage. The pad contacts the head of the user, so this second surface is appropriate for touching the head and face of a person. The second surface can be textured, cloth, hypoallergenic, or other material suitable for contacting sensitive skin. The pad is separable from the frame or harness; so the pad can be washed. Versions of the pad include shapes for eye covers, eye masks, face masks, and straps for engaging a hat being worn by the user. The head of any size user with any type of head gear, such as a hat or wig, can be accommodated by the present invention.

BRIEF DESCRIPTION OF THE DRAWINGS

FIG. 1 is a front elevation view of an embodiment of the head and neck support system of the present invention, showing an assembled configuration.

FIG. 2 is a perspective view of an embodiment of the adjustable head and neck support system of the present invention, showing the rods.

FIG. 3 is a perspective view of an embodiment of the adjustable head and neck support system of the present invention, showing the frame.

FIG. 4 is a perspective view of an embodiment of the adjustable head and neck support system of the present invention, showing the pad.

DETAILED DESCRIPTION OF THE DRAWINGS

Referring to FIGS. 1-15, the head and neck support system 10 comprises a pair of rods 20, a frame 30, and a pad 50. The support system 10 allows a user to sleep and rest in the seated position. The support system 10 has an assembled configuration to support the head of the user and a disassembled configuration for storage. In the disassembled configuration, the support system 10 can also be used as a lumbar support. The support system 10 is adjustable for any size user and is compatible with any size chair. Any chair, with or without a headrest can be used with the present invention.

Figure 5:
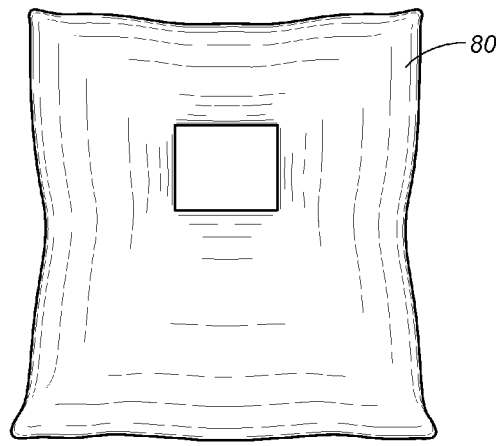
FIG. 5 is a perspective view of an embodiment of the adjustable head and neck support system of the present invention, showing the cushion element.
Figure 6:
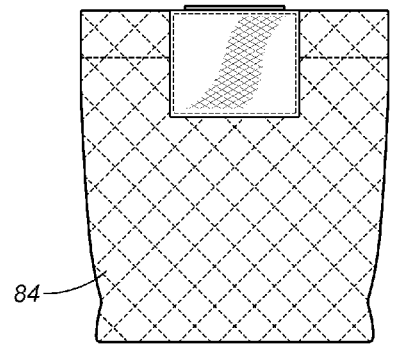
FIG. 6 is a perspective view of an embodiment of the adjustable head and neck support system of the present invention, showing the slip element.
Figure 7:
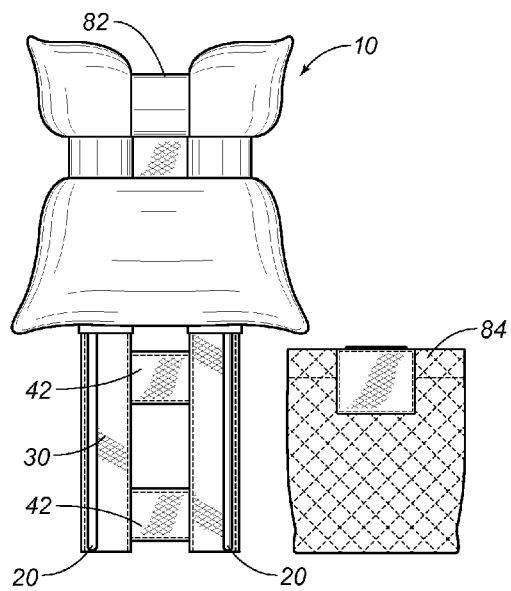
FIG. 7 is a perspective view of an embodiment of the adjustable head and neck support system of the present invention, showing assembly of the frame and cushion element.
Figure 8:
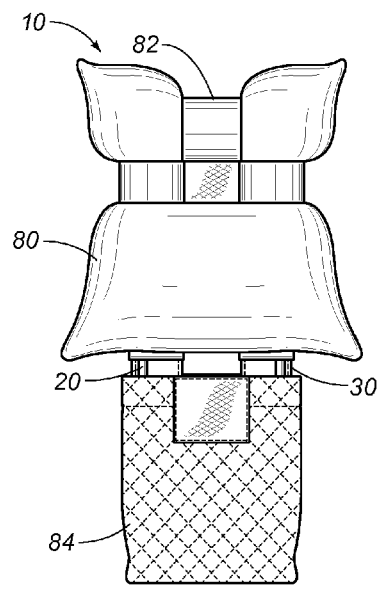
FIG. 8 is a perspective view of an embodiment of the adjustable head and neck support system of the present invention, showing the assembly of the frame, cushion element, and the slip element.
Figure 9:
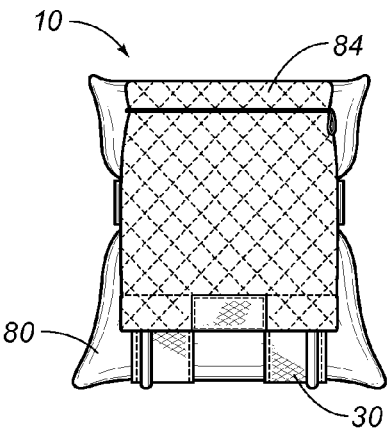
FIG. 9 is a perspective view of an embodiment of the adjustable head and neck support system of the present invention, showing a disassembled configuration.
Figure 10:
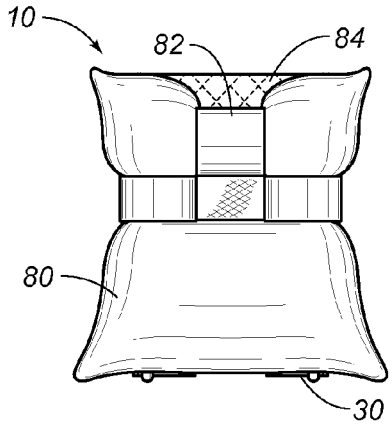
FIG. 10 is another perspective view of the embodiment in FIG. 9.
Figure 11:
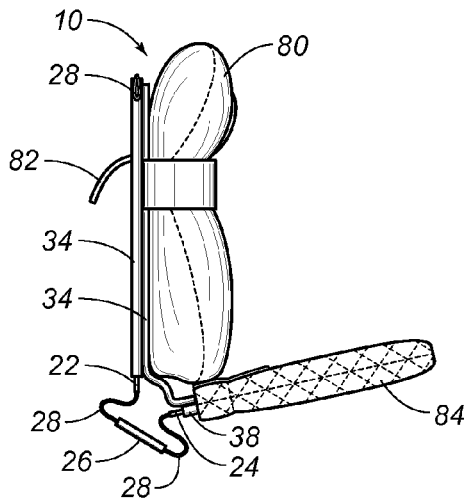
FIGS. 11 and 12 are side elevation views of the rods in transition from the shortened configuration to the extended configuration.
Figure 12:
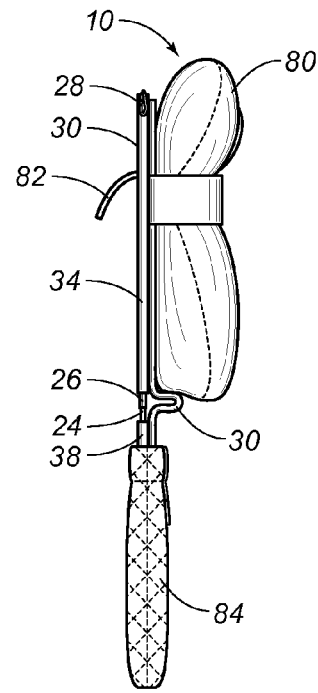
Figure 13:
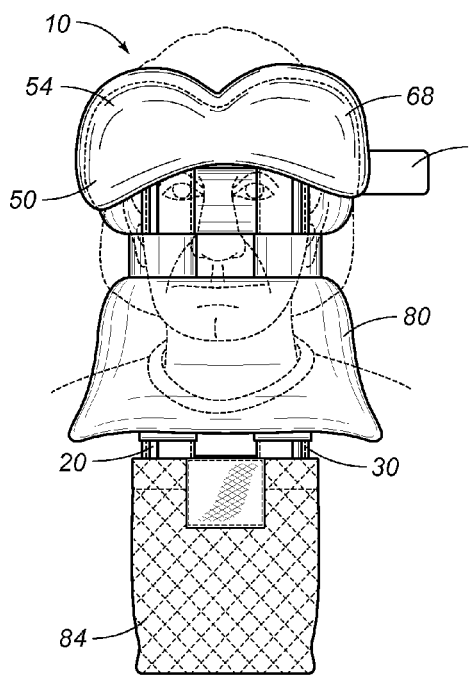
FIG. 13 is another perspective view of an embodiment of the adjustable head and neck support system of the present invention, showing the head of the user in the pad.
Figure 14:
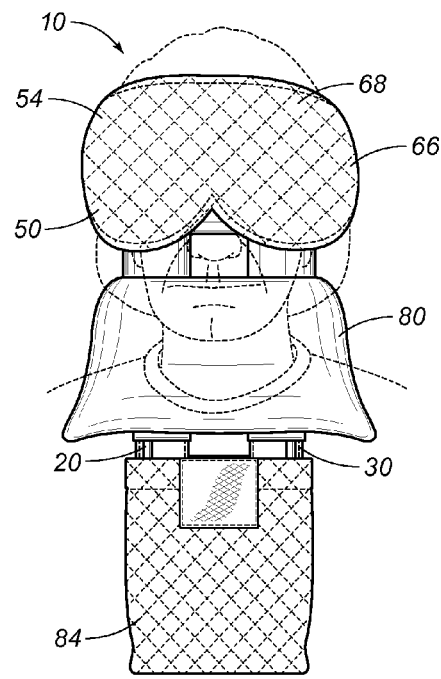
FIGS. 14-15 are front and side elevation views, respectively, of embodiments of the adjustable head and neck support system of the present invention, showing a different pad embodiment.
Figure 15:
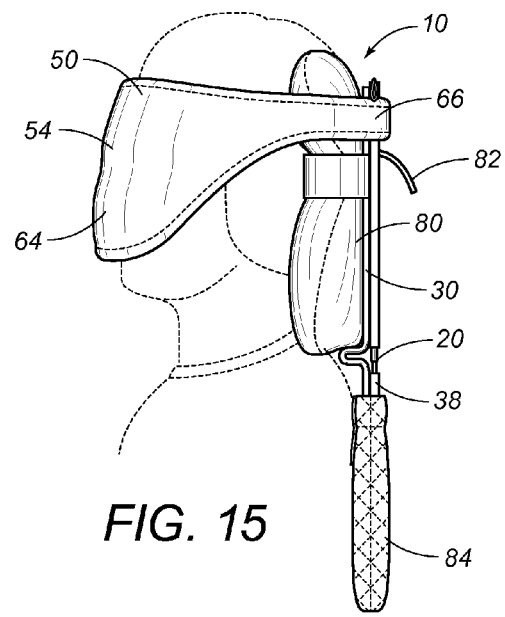

FIGS. 1, 2, 7, 8, and 11-12 show the rods 20. Each rod 20 has adjustable length for any size user. Each rod 20 has a shortened configuration and an extended configuration. FIGS. 2, 7 and 8 show the extended configuration. FIGS. 11-12 show the transition from between shortened and extended configuration. In the embodiment of FIGS. 1, 2, 7, 8 and 11-12, each rod 20 is collapsible, the shortened configuration corresponding to a collapsed position. Each rod 20 is comprised of an upper half 22, a lower half 24, a transition section 26 and an elastic core 28. The elastic core 28 stretches to allow the upper half 22 and lower half 24 to engage and disengage from the transition section 26. The extended configuration has the upper half 22, the lower half 24 and the transition section 26 in alignment and tensioned by the elastic core 28, as in FIGS. 2 and 12. The shorted configuration has the upper half 22 separated and folded over the lower half 24 and the transition section 26, as in FIGS. 9 and 11. The shortened configuration corresponds to FIG. 9 with the support system 10 prepared for storage or as a lumbar support.

In an alternative embodiment, each rod is telescoping, such that the shortened configuration and the extended configuration correspond to length of each rod according to an amount of telescoping. For a threaded telescoping rod, the amount of threaded engagement controls the length. The present invention also includes these or any other means for moving between the shortened configuration and the extended configuration of the pair of rods for the present invention. 20

FIGS. 1, 3, and 7-15 show the frame 30. Embodiments of the frame 30 comprise an upper portion 32 and a lower portion 36. The upper portion 32 has an upper front planar surface 32a, an upper back planar surface 32b, and upper sleeves 34. The lower portion 36 has a lower front planar surface 36a, a lower back planar surface 36b, and lower sleeves 38. The upper sleeves 34 connected to the lower sleeves 38. FIGS. 7-8 and 11-12 show that the pair of rods 20 inserted into the upper sleeves 34 and the lower sleeves 38 so that the upper sleeves 34 and the lower sleeves 38 are aligned with each other. In FIGS. 11-12, when each rod 20 is in the shortened configuration, the pair of rods 20 can still be inserted through the upper sleeves 34 and the lower sleeves 38 of the frame 30. For the frame 30, the upper front planar surface 32a and the lower front planar surface 36a forming a facing side oriented to the user, when the system 10 is supporting the head and neck. The upper back planar surface 32b and the lower back planar surface 36b form a contact side oriented to the back of the chair or seat.

In some embodiments, the upper portion 32 further comprises upper straps, the upper straps 40 to connect the upper sleeves 34. The upper straps 40 maintaining position of the pair of rods 20 relative to each other, while keeping the frame 30 flexible for the back of the user and the chair or seat back. These upper straps 40 can be elastic. Similarly, the lower portion 36 can comprise lower straps 42 for connecting the lower sleeves 38 to each other. The lower straps 42 can also be elastic.

FIGS. 1, 4, and 13-15 show the pad 50 having an attachment means 52 to the frame 30, a first surface 54 and a second surface 56. The attachment means 52 mounted on the second surface 56 and engages the facing side of the frame 54. The attachment means 52 can be any known connector, such as hook and loop fasteners, buttons, adhesive, snaps, and laces. The pad 50 wraps around the frame 30 so as to form a loop with the second surface 56 inside the loop and the first surface 58 outside the loop, as in FIGS. 1 and 13-15. The pad 50 engages the head of the user and holds the head of the user to the frame 30.

Embodiments of the pad 50 include an eye mask section 60 and a band section 62 of FIG. 4. The attachment means 52 is mounted on the band section 62, and the pad 50 attaches to the upper portion 32 of the frame 30 by the attachment means 52 so as to position the second surface 56 facing the frame 30. In an alternate embodiment, the pad 50 includes a face mask section 64 and a band section 66 as in FIGS. 14-15. The attachment means 52 also mounts on the band section 66. In still another embodiment, the pad 50 is comprised of a strap section 68 and a band section 70 as in FIG. 13. The strap section 68 holds the hat of the user, so that that a hat can be worn while using the system 10.

FIG. 1-15 show that head and neck support system 10 has an assembled configuration. Each rod 20 is in the extended configuration, and the pair of rods 20 insert through the upper sleeves 34 and the lower sleeves 38. The upper portion 32 and the lower portion 36 are planar, so that the loop formed by the pad 50 is suitable to hold a head of a user.

FIGS. 5 and 7-10 show an embodiment of the head and neck support system 10 with the cushion element 80. The frame 30 further comprises a top strap 82 attached to the upper portion 32. The cushion element 80 has a hole so that the top strap 82 passes through the hole for attachment to the upper portion 32 of the frame 30. The cushion element 80 is positioned between the frame 30 and the pad 50 and remains adjustable by the top strap 82. In some embodiments, the cushion element 80 is comprised of memory foam.

FIGS. 6-10 show an embodiment of the head and neck support system 10 with a slip element 84 mounted over the lower portion 36 of the frame 30. The slip element 84 covering the facing side and the contact side of the lower portion 36. In order to provide a comfortable surface to the back of the user and to prevent damage to the back of the chair.

The present invention is a head and neck support system to facilitate sleeping in a seated position. The difficulty of stabilizing the head without straining neck muscles is addressed by the innovation of the present invention. The system can aid sleepers or people with medical conditions requiring extra head and neck support in the seated position. The pad wraps the head to reduce nodding movement, and the frame supports the head against the seatback to prevent muscle fatigue in the neck. The user can relax and sleep without needing to balance the head and without the risk of irregular nodding motions. There are travel applications for sleeping during passenger rides, and there are medical applications for patients with physical conditions, which require the seated position for resting.

The support system of the present invention is also adjustable to account for users of different heights. The pad can be set at different relative positions to the seatback to fit any user. The rods and the frame are adjustable. The telescoping or collapsing action between the shortened configuration and the extended configuration of the rods enable settings for any height of the user.

Embodiments of the headrest system also have an adjustable pad relative to the frame. The pad can attach in different positions on the frame, so that the system has a further range of extension and variation. The pad can form an eye cover or face mask to shield light from the eyes of the user. Sleeping can be easier with support and reduced light. Alternatively, the pad can form an open face configuration so that there are no obstructions to breathing. There is also an embodiment to account for headwear, such as hats. The pad is removable for washing and cleaning separate from the frame or harness. Straps on the pad can engage portions of the frame, so that a different amount of the frame can be attached to the pad. The system is further extendable by setting the relative position of the frame and the pad.

The foregoing disclosure and description of the invention is illustrative and explanatory thereof. Various changes in the details of the illustrated structures, construction and method can be made without departing from the true spirit of the invention.

I claim:

1. A head and neck support system, comprising:
   a pair of rods, each rod having adjustable length, each rod having a shortened configuration and an extended configuration, each rod being comprised of an upper half, a lower half, a transition section, and an elastic core;
   a frame being comprised of an upper portion and a lower portion, said upper portion having an upper front planar surface, an upper back planar surface, and upper sleeves, said lower portion having a lower front planar surface, a lower back planar surface, and lower sleeves, said upper sleeves being connected to said lower sleeves, said pair of rods being inserted into said upper sleeves and said lower sleeves and being aligned with each other, said upper front planar surface and said lower front planar surface forming a facing side, said upper back planar surface and said lower back planar surface forming a contact side; and
   a pad having an attachment means for mounting to said frame, a first surface and a second surface, said attachment means being mounted on said second surface and engaging said contact side of said frame, said pad wrapping around said frame so as to form a loop with said second surface inside said loop and said first surface outside said loop,
   wherein each rod is collapsible, said extended configuration having respective upper halves, lower halves and transition sections in alignment and tensioned by respective elastic cores, said shortened configuration corresponding to a collapsed position, and
   wherein each rod is in said shortened configuration, said pair of rods being inserted through said upper sleeves and said lower sleeves, said lower portion and respective lower halves of each rod folding over said upper portion and respective upper halves of each rod and forming a disassembled configuration, said disassembled configuration corresponding to said facing side of said upper portion facing said facing side of said lower portion tensioned by respective elastic cores so as to be wrapped by said pad on said facing side and so as to be suitable for storage.

2. The head and neck support system, according to claim 1, wherein each rod is in said extended configuration, said pair of rods being inserted through said upper sleeves and said lower sleeves, said upper portion and said lower portion being planar and forming an assembled configuration, said assembled configuration corresponding to said loop being suitable to hold a head of a user.

3. The head and neck support system, according to claim 1, wherein said upper portion further comprises upper straps, said upper straps connecting said upper sleeves and maintaining position of said pair of rods.

4. The head and neck support system, according to claim 3, wherein said upper straps are elastic.

5. The head and neck support system, according to claim 1, wherein said lower portion further comprises lower straps, said lower straps connecting said lower sleeves and maintaining position of said pair of rods.

6. The head and neck support system, according to claim 5, wherein said lower straps are elastic.

7. The head and neck support system, according to claim 1, wherein said attachment means is at least one of group consisting of hook and loop fasteners, buttons, adhesive, snaps, and laces.

8. The head and neck support system, according to claim 1, wherein said pad is comprised of eye mask section and a band section, said attachment means being mounted on said band section, said pad being attached to said upper portion of said frame by said attachment means so as to position said second surface facing said frame.

9. The head and neck support system, according to claim 1, wherein said pad is comprised of face mask section and a band section, said attachment means being mounted on said band section, said pad being attached to said upper portion of said frame by said attachment means so as to position said second surface facing said frame.

10. The head and neck support system, according to claim 1, wherein said pad is comprised of a strap section and a band section, said attachment means being mounted on said band section, said pad being attached to said upper portion of said frame by said attachment means so as to position said second surface facing said frame.

11. The head and neck support system, according to claim 1, wherein said frame further comprises a top strap, said top strap being attached to said upper portion, further comprising:
a cushion element attached to said upper portion of said frame, said cushion element being placed between said frame and said pad and positioned by said top strap.

12. The head and neck support system, according to claim 11, wherein said cushion element is comprised of memory foam.

13. The head and neck support system, according to claim 1, further comprising:
a slip element mounted over said lower portion of said frame, said slip element covering said facing side and said contact side of said lower portion.

14. A head and neck support system, comprising:
a pair of rods, each rod having adjustable length, each rod having a shortened configuration and an extended configuration, each rod being comprised of an upper half, a lower half, a transition section, and an elastic core;
a frame being comprised of an upper portion, a lower portion and a top strap connect to said upper portion, said upper portion having an upper front planar surface, an upper back planar surface, and upper sleeves, said lower portion having a lower front planar surface, a lower back planar surface, and lower sleeves, said upper sleeves being connected to said lower sleeves, said pair of rods being inserted into said upper sleeves and said lower sleeves and being aligned with each other, said upper front planar surface and said lower front planar surface forming a facing side, said upper back planar surface and said lower back planar surface forming a contact side;
a pad having an attachment means for mounting to said frame, a first surface and a second surface, said attachment means being mounted on said second surface and engaging said contact side of said frame, said pad wrapping around said frame so as to form a loop with said second surface inside said loop and said first surface outside said loop; and
a cushion element attached to said upper portion of said frame, said cushion element being placed between said frame and said pad and positioned by said top strap,
wherein each rod is collapsible, said extended configuration having respective upper halves, lower halves and transition sections in alignment and tensioned by respective elastic cores, said shortened configuration corresponding to a collapsed position, and
wherein each rod is in said shortened configuration, said pair of rods being inserted through said upper sleeves and said lower sleeves, said lower portion and respective lower halves of each rod folding over said cushion element on said upper portion and respective upper halves of each rod and forming a disassembled configuration, said disassembled configuration corresponding to said cushion element facing said facing side of said lower portion tensioned by respective elastic cores so as to be wrapped by said pad on said facing side and so as to be suitable for lumbar support.

15. The head and neck support system, according to claim 14, wherein each rod is in said extended configuration, said pair of rods being inserted through said upper sleeves and said lower sleeves, said upper portion and said lower portion being planar and forming an assembled configuration, said assembled configuration corresponding to said loop being suitable to hold a head of a user.

16. The head and neck support system, according to claim 14, wherein said upper portion further comprises upper straps, said upper straps connecting said upper sleeves and maintaining position of said pair of rods, and
wherein said lower portion further comprises lower straps, said lower straps connecting said lower sleeves and maintaining position of said pair of rods.

17. The head and neck support system, according to claim 14, wherein said attachment means is at least one of group consisting of hook and loop fasteners, buttons, adhesive, snaps, and laces.

* * * * *